United States Patent
Kim et al.

(10) Patent No.: US 9,263,772 B2
(45) Date of Patent: Feb. 16, 2016

(54) JELLY-ROLL TYPE ELECTRODE ASSEMBLY PATTERN-COATED WITH ACTIVE MATERIAL AND SECONDARY BATTERY INCLUDING THE SAME

(71) Applicant: LG Chem, Ltd., Seoul (KR)

(72) Inventors: Hyun Tae Kim, Daejeon (KR); Soon Ho Ahn, Seoul (KR); Kyoung Won Kang, Daejeon (KR); Ki Woong Kim, Daejeon (KR)

(73) Assignee: LG Chem, Ltd. (KR)

( * ) Notice: Subject to any disclaimer, the term of this patent is extended or adjusted under 35 U.S.C. 154(b) by 267 days.

(21) Appl. No.: 13/966,645

(22) Filed: Aug. 14, 2013

(65) Prior Publication Data

US 2014/0004399 A1  Jan. 2, 2014

Related U.S. Application Data

(63) Continuation of application No. PCT/KR2012/011294, filed on Dec. 21, 2012.

(30) Foreign Application Priority Data

Dec. 23, 2011 (KR) .................. 10-2011-0141401
Dec. 21, 2012 (KR) .................. 10-2012-0150452

(51) Int. Cl.
*H01M 10/0587* (2010.01)
*H01M 4/48* (2010.01)
(Continued)

(52) U.S. Cl.
CPC ............ *H01M 10/0587* (2013.01); *H01M 4/48* (2013.01); *H01M 4/5825* (2013.01);
(Continued)

(58) Field of Classification Search
CPC .......... H01M 10/0587; H01M 10/049; H01M 10/0525; H01M 10/0431; H01M 4/48; H01M 4/5825; H01M 2220/20; H01M 2220/30; Y10T 29/49115; Y02T 10/7005
See application file for complete search history.

(56) References Cited

U.S. PATENT DOCUMENTS

2006/0216609 A1   9/2006  Abe et al.
2009/0239133 A1   9/2009  Kosugi
(Continued)

FOREIGN PATENT DOCUMENTS

CN   101542817 A   9/2009
CN   101807681 A   8/2010
(Continued)

OTHER PUBLICATIONS

English translation of JP Publication 2007-026786, Feb. 2007.*
(Continued)

*Primary Examiner* — Brittany Raymond
(74) *Attorney, Agent, or Firm* — Lerner, David, Littenberg, Krumholz & Mentlik, LLP

(57) ABSTRACT

Provided is a jelly-roll type electrode assembly pattern-coated with active materials manufactured by winding and compressing a separator and an anode and a cathode arranged on both sides of the separator. The anode includes anode flat coated portion coated with an anode active material and anode curved uncoated portion not coated with the anode active material, which are alternately formed. The cathode includes a cathode flat coated portion coated with a cathode active material and a cathode curved uncoated portion not coated with the cathode active material, which are alternately formed.

20 Claims, 4 Drawing Sheets

(51) Int. Cl.
*H01M 10/04* (2006.01)
*H01M 10/058* (2010.01)
*H01M 4/58* (2010.01)
*H01M 10/0525* (2010.01)

(52) U.S. Cl.
CPC ............ *H01M10/04* (2013.01); *H01M 10/049* (2013.01); *H01M 10/0431* (2013.01); *H01M 10/058* (2013.01); *H01M 10/0525* (2013.01); *H01M 2220/20* (2013.01); *H01M 2220/30* (2013.01); *Y02T 10/7005* (2013.01); *Y10T 29/49115* (2015.01)

(56) References Cited

U.S. PATENT DOCUMENTS

| | | |
|---|---|---|
| 2010/0209773 A1 | 8/2010 | Sakashita et al. |
| 2010/0310924 A1 | 12/2010 | Kaneda et al. |
| 2011/0052987 A1 | 3/2011 | Katayama et al. |
| 2013/0022866 A1 | 1/2013 | Noh et al. |

FOREIGN PATENT DOCUMENTS

| | | | |
|---|---|---|---|
| JP | H10-302798 A | | 11/1998 |
| JP | 2002-093404 A | | 3/2002 |
| JP | 2003-346799 | * | 12/2003 |
| JP | 2007-026786 | * | 2/2007 |
| JP | 2010-080427 A | | 4/2010 |
| JP | 2011-014238 | | 1/2011 |
| KR | 10-2000-0051739 A | | 8/2000 |
| KR | 10-2005-0113860 A | | 12/2005 |
| KR | 10-2011-0117628 A | | 10/2011 |
| WO | 2009/044741 A1 | | 4/2009 |

OTHER PUBLICATIONS

English translation of JP Publication 2003-346799, Dec. 2003.*
International Search Report for Application No. PCT/KR2012/011294 dated Apr. 12, 2013.
Office Action from Chinese Application No. 201280018774.6, dated Apr. 15, 2015.
Search report from European Application No. 12859435.5, dated May 12, 2015.

* cited by examiner

JELLY-ROLL TYPE ELECTRODE ASSEMBLY PATTERN-COATED WITH ACTIVE MATERIAL AND SECONDARY BATTERY INCLUDING THE SAME

CROSS-REFERENCE TO RELATED APPLICATION

The present application is a continuation of International Application No. PCT/KR2012/011294 filed on Dec. 21, 2012, which claims priority to Korean Patent Application No. 10-2012-0150452 filed on Dec. 21, 2012, and Korean Patent Application No. 10-2011-0141401 filed on Dec. 23, 2011, in the Republic of Korea, the disclosures of which are incorporated herein by reference.

TECHNICAL FIELD

The present invention relates to a jelly-roll type electrode assembly pattern-coated with active materials and a secondary battery including the same.

BACKGROUND ART

Recently, interest in energy storage technology has been increased. As application thereof spreads to the fields of cellular phones, camcorders, notebook PCs, and additionally, energy for electric vehicles, electrochemical devices have researched and developed. Electrochemical devices are most interesting field in such aspects, and development of secondary batteries capable of being charged and discharged has become the focus of attention. Recently, to improve capacitance density and specific energy of batteries, researches and developments for new electrodes and batteries have been performed.

Lithium secondary batteries developed early in 1990's among secondary batteries currently applied have a much higher operating voltage and energy density than typical batteries such as Ni-MH, Ni—Cd, and lead sulfate batteries. However, such lithium secondary batteries have limitations such as ignition and explosions caused by using organic electrolytes and complicated manufacturing processes.

Such secondary batteries are configured to have a structure in which an electrode assembly having a structure of a cathode/a separator/an anode, which is chargeable and dischargeable, is mounted on a battery case. As a general example of the electrode assembly, there are jelly-roll type electrode assemblies.

However, in the case of jelly-roll type electrode assemblies, during winding and compressing processes, due to a flat portion and a curve portion, breaks and cracks occur at the curve portion.

DISCLOSURE OF THE INVENTION

Technical Problem

An aspect of the present invention provides a jelly-roll type electrode assembly pattern-coated with active materials, manufactured by winding and compressing a separator and an anode and a cathode disposed on both sides of the separator, in which the anode has an anode flat coated portion coated with an anode active material and an anode curved-uncoated portion not coated with the anode active material, the anode flat coated portion and the anode curved-uncoated portion being alternately formed, and the cathode has a cathode flat coated portion coated with a cathode active material and a cathode curved-uncoated portion not coated with the cathode active material, the cathode flat coated portion and the cathode curved-uncoated portion being alternately formed.

Technical Solution

However, the aspect of the present invention is not limited to the described above and other aspects not mentioned will be clearly understood by those skilled in the art from following descriptions.

According to an aspect of the present invention, there is provided a jelly-roll type electrode assembly pattern-coated with active materials manufactured by winding and compressing a separator and an anode and a cathode arranged on both sides of the separator. The anode includes an anode flat coated portion coated with an anode active material and an anode curved uncoated portion not coated with the anode active material, which are alternately formed. The cathode includes a cathode flat coated portion coated with a cathode active material and a cathode curved uncoated portion not coated with the cathode active material, which are alternately formed.

According to another aspect of the present invention, there is provided a secondary battery including the jelly-roll type electrode assembly pattern-coated with active materials.

According to still another aspect of the present invention, there is provided a medium-large sized battery module or battery pack including a plurality of the secondary batteries, which are electrically connected to one another.

Advantageous Effects

The present invention relates to a jelly-roll type electrode assembly pattern-coated with active materials and a secondary battery including the same. A curved portion of the jelly-roll type electrode assembly is uncoated with the active material, thereby effectively preventing breaks and cracks that may occur at the curved portion of the electrode assembly during a process of winding and compressing the jelly-roll type electrode assembly, so that the charging and discharging efficiency of the second battery can be increased to improve rapid charging properties due to reduced internal resistances and thus provide secondary batteries having high capacitances and to reduce an error rate.

MODE FOR CARRYING OUT THE INVENTION

Figure 1A:
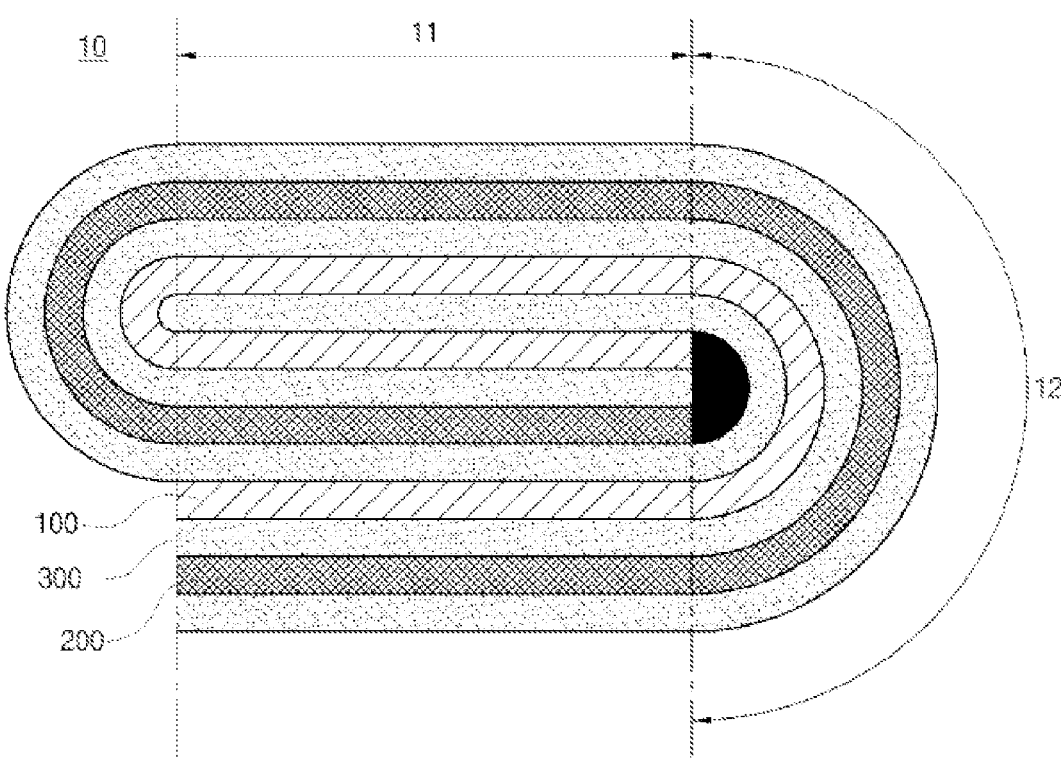
FIGS. 1a and 1b are cross-sectional views illustrating general jelly-roll type electrode assemblies.

The present inventors verify that a curved portion of a jelly-roll type electrode assembly is uncoated with an active material, thereby effectively preventing breaks and cracks that may occur at the curved portion of the electrode assembly during a process of winding and compressing the jelly-roll type electrode assembly.

Hereinafter, embodiments of the present invention will be described in detail with reference to the attached drawings.

While various modifications of the present invention are being allowed, exemplary embodiments thereof will be shown in the drawings and will be described in detail. However, the present invention will not be limited thereto but includes all the modifications, equivalents, and alternatives in accordance with the scope of the present invention defined by the claims thereof.

In detail, present invention provides a jelly-roll type electrode assembly pattern-coated with active materials, manufactured by winding and compressing a separator and an anode and a cathode disposed on both sides of the separator, in which the anode has an anode flat coated portion coated with an anode active material and an anode curved-uncoated portion not coated with the anode active material, the anode flat coated portion and the anode curved-uncoated portion being alternately formed, and the cathode has a cathode flat coated portion coated with a cathode active material and a cathode curved-uncoated portion not coated with the cathode active material, the cathode flat coated portion and the cathode curved-uncoated portion being alternately formed.

A general jelly-roll type electrode assembly is manufactured by winding and compressing a separator and an anode and a cathode disposed on both sides of the separator, and is divided into an electrode assembly flat portion and an electrode assembly curved portion.

In this case, the term of "an electrode assembly flat portion" designates a flat portion of a jelly-roll type electrode assembly and the term of "an electrode assembly curved portion" designates a curved portion of both sides of the jelly-roll type electrode assembly.

The anode flat coated portion or the cathode flat coated portion corresponds to the electrode assembly flat portion. Also, the anode flat coated portion or the cathode flat coated portion is coated with the active material, in which both sides or only one side of the anode or the cathode may be coated with the active material. However, considering a capacitance of the second battery, the both sides thereof may be coated with the active material.

On the other hand, the anode curved uncoated portion is a part corresponding to an electrode assembly curved portion, in which a width thereof becomes wider progressively from a first end to a last end of the anode in contact with a core for winding the electrode assembly.

Figure 1B:
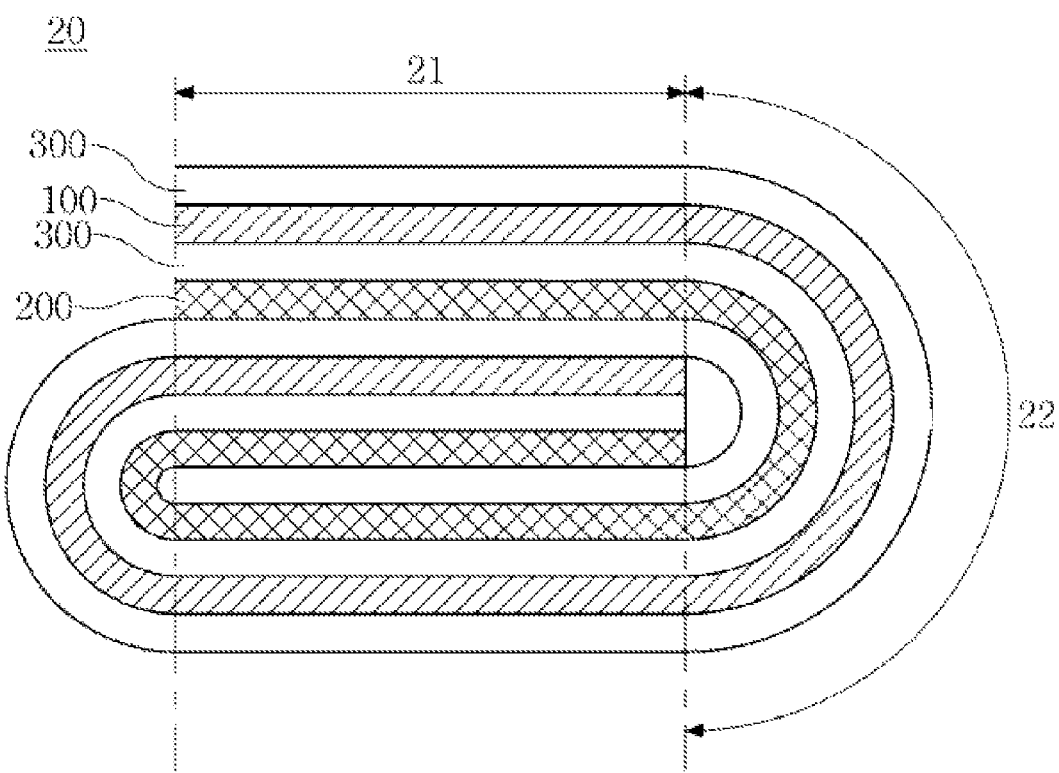

FIGS. 1a and 1b illustrate a winding state of a jelly-roll electrode assembly 10 according to an embodiment of the present invention. That is, in the case of winding an electrode assembly configured to have an anode 100, a separator 300 and a cathode 200, an initial winding direction may be a direction of the anode 100 as shown in FIG. 1a or may be a direction of the cathode 200 as shown in FIG. 1b.

In detail, the electrode assembly 10, as shown in FIG. 1a, may be initially wound in an anode direction. In this case, a radius curvature of the anode 100 is smaller than that of the cathode 200 at an initial curved portion of the electrode assembly. That is, a radius curvature of an initial curved uncoated portion of the anode 100 is smaller than that of an initial curved uncoated portion of the cathode 200.

On the other hand, the jelly-roll type electrode assembly 10 is manufactured by winding and compressing the separator 300 and the anode 100 and the cathode 200 arranged on both sides of the separator 300 and is formed being divided into an electrode assembly flat portion 11 and an electrode assembly curved portion 12.

On the other hand, a width of the curved uncoated portion of the anode forms an arithmetical in such a way that the width becomes wider progressively from a first end to a last end of the anode in contact with a core for winding the electrode assembly. In this case, a difference (an allowance) between sequential widths of the anode curved uncoated portions is obtained by adding a thickness of the separator, ½ of a thickness of the anode, and ½ of a thickness of the cathode and may be uniform. Although the width of the curved uncoated portion of the anode is formed to be smaller than that of the electrode assembly curved portion, as long as an inflection point of the curved portion of the electrode assembly is included in the curved uncoated portion of the anode, it is not impracticable to embody the present invention. In other words, since a crack of an anode active material applied over the entirety of an anode current collector most severely occurs at the inflection point of the curved portion of the electrode assembly, when leaving at least this uncoated, it is possible to effectively prevent occurrence of the crack of the anode active material. In this case, the inflection point of the curved portion of the electrode assembly designates an apex where the electrode assembly is wound and then bent in a reverse direction.

On the other hand, the term of "an inner side" designates a side heading a central part direction and the term of "an outer side" designates a side heading an external part direction. Also, the term of "the central part direction" designates a direction of a first end part in contact with the core for winding the electrode assembly and "the external part direction" designates a last end part where winding the electrode assembly is finished.

In detail, in the case of the jelly-roll type electrode assembly, the width of the inner side of the anode curved uncoated portion satisfies a following equation.

$$W(I)n \leq \pi\{(Ts/2)+(n-1)(Ts+Ta/2+Tc/2)\} \qquad \text{Equation (1)}$$

In Equation 1, $W(I)n$ designates a width of an inner side of an nth anode curved uncoated portion, Ts designates a thickness of the separator, Ta designates a thickness of the anode, Tc designates a thickness of the cathode, and n is an integer.

Also, the width of the outer side of the anode curved uncoated portion satisfies a following equation.

$$W(II)n \leq \pi\{(Ts/2+Ta)+(n-1)(Ts+Ta/2+Tc/2)\} \qquad \text{Equation (2)}$$

In Equation 2, $W(II)n$ designates a width of an outer side of the nth anode curved uncoated portion, Ts designates the thickness of the separator, Ta designates a thickness of the anode, Tc designates a thickness of the cathode, and n is an integer.

On the other hand, the cathode curved uncoated portion is a part corresponding to the electrode assembly curved portion, in which a width thereof becomes wider progressively from a first end to a last end of the cathode in contact with a core for winding the electrode assembly. In this case, a difference (an allowance) between sequential widths of the cathode curved uncoated portion is obtained by adding a thickness of the separator, ½ of the thickness of the anode, and ½ of the thickness of the cathode and may be uniform.

As similar to the anode, although the width of the curved uncoated portion of the cathode is formed to be smaller than that of the electrode assembly curved portion, as long as an inflection point of the curved portion of the electrode assembly is included in the curved uncoated portion of the cathode, it is not impracticable to embody the present invention. In other words, since a crack of a cathode active material applied over the entirety of a cathode current collector most severely occurs at the inflection point of the curved portion of the electrode assembly, when leaving at least this portion uncoated, it is possible to effectively prevent occurrence of the crack of the cathode active material.

In detail, in the case of the jelly-roll type electrode assembly, the width of the inner side of the cathode curved uncoated portion satisfies a following equation.

$$W(III)n \leq \pi\{(3Ts/2+Ta)+(n-1)(Ts+Ta/2+Tc/2)\} \quad \text{Equation (3)}$$

In Equation 3, $W(III)n$ designates a width of an inner side of an nth cathode curved uncoated portion, Ts designates a thickness of the separator, Ta designates a thickness of the anode, Tc designates a thickness of the cathode, and n is an integer.

Also, the width of the outer side of the cathode curved uncoated portion satisfies a following equation.

$$W(IV)n \leq \pi\{(3Ts/2+Ta+Tc)+(n-1)(Ts+Ta/2+Tc/2) \quad \text{Equation (4)}$$

In Equation 4, $W(IV)n$ designates a width of an outer side of the nth cathode curved uncoated portion, Ts designates the thickness of the separator, Ta designates a thickness of the anode, Tc designates a thickness of the cathode, and n is an integer.

Also, an electrode assembly 20 according to an embodiment of the present invention may be, as shown in FIG. 1b, may be initially wound in a cathode direction. In this case, a radius curvature of the cathode becomes smaller than that of the anode at an initial curved portion of the electrode assembly. Referring to FIG. 1b, the electrode assembly 20 is manufactured by winding and compressing the separator 300 and the anode 100 and the cathode 200 arranged on both sides of the separator 300 and is formed being divided into an electrode assembly flat portion 21 and an electrode assembly curved portion 22.

In this case, a width of a curved uncoated portion of the cathode and a width of a curved uncoated portion of the anode may be calculated similar to the case in which the initial winding direction is the anode direction, as described above.

In detail, a width of the curved uncoated portion of the cathode forms an arithmetical progression in such a way that the width becomes wider progressively from a first end to a last end of the cathode in contact with a core for winding the electrode assembly. In this case, a difference (an allowance) between sequential widths of the cathode curved uncoated portion is obtained by adding a thickness of the separator, ½ of a thickness of the cathode, and ½ of a thickness of the anode and may be uniform. Although the width of the curved uncoated portion of the cathode is formed to be smaller than that of the electrode assembly curved portion, an inflection point of the curved portion of the electrode assembly may be included in the curved uncoated portion of the cathode.

In detail, in the case of the jelly-roll type electrode assembly, the width of the inner side of the cathode curved uncoated portion satisfies a following equation.

$$W(I)n \leq \pi\{(Ts/2)+(n-1)(Ts+Ta/2+Tc/2)\} \quad \text{(Equation 1)}$$

In Equation 1, $W(I)n$ designates a width of an inner side of an nth cathode curved uncoated portion, Ts designates a thickness of the separator, Ta designates a thickness of the cathode, Tc designates a thickness of the anode, and n is an integer.

Also, the width of the outer side of the cathode curved uncoated portion satisfies a following equation.

$$W(II)n \leq \pi\{(Ts/2+Ta)+(n-1)(Ts+Ta/2+Tc/2)\} \quad \text{Equation (2)}$$

In Equation 2, $W(II)n$ designates a width of an outer side of the nth cathode curved uncoated portion, Ts designates the thickness of the separator, Ta designates a thickness of the cathode, Tc designates a thickness of the anode, and n is an integer.

On the other hand, the anode curved uncoated portion is a part corresponding to the electrode assembly curved portion, in which a width thereof becomes wider progressively from a first end to a last end of the anode in contact with a core for winding the electrode assembly to. In this case, a difference (an allowance) between sequential widths of the anode curved uncoated portion is obtained by adding a thickness of the separator, ½ of the thickness of the cathode, and ½ of the thickness of the anode and may be uniform. As similar to the cathode, while the width of the curved uncoated portion of the anode is being formed to be smaller than that of the electrode assembly curved portion, an inflection point of the curved portion of the electrode assembly may be included in the curved uncoated portion of the anode.

In detail, in the case of the jelly-roll type electrode assembly, the width of the inner side of the cathode curved uncoated portion satisfies a following equation.

$$W(III)n \leq \pi\{(3Ts/2+Ta)+(n-1)(Ts+Ta/2+Tc/2)\} \quad \text{Equation (3)}$$

In Equation 3, $W(III)n$ designates a width of an inner side of an nth anode curved uncoated portion, Ts designates a thickness of the separator, Ta designates a thickness of the cathode, Tc designates a thickness of the anode, and n is an integer.

Also, the width of the outer side of the anode curved uncoated portion satisfies a following equation.

$$W(IV)n \leq \pi\{(3Ts/2+Ta+Tc)+(n-1)(Ts+Ta/2+Tc/2) \quad \text{Equation (4)}$$

In Equation 4, $W(IV)n$ designates a width of an outer side of the nth anode curved uncoated portion, Ts designates the thickness of the separator, Ta designates a thickness of the cathode, Tc designates a thickness of the anode, and n is an integer.

In addition, in the electrode assembly, the cathode active material may be lithium iron phosphate having an olivine crystal structure having a composition satisfying a following formula.

$$Li_{1+a}Fe_{1-x}M_x(PO_{4-b})X_b \quad \text{Formula (1)}$$

In Formula (1), M is at least one selected from the group consisting Al, Mg, Ni, Co, Mn, Ti, Ga, Cu, V, Nb, Zr, Ce, In, Zn, and Y, X is at least one selected from the group consisting of F, S, and N, and) $-0.5 \leq a \leq +0.5$, $0 \leq x \leq 0.5$, $0 \leq b \leq 0.1$.

Since the lithium iron phosphate has excellent stability at a high temperature, and particularly, Fe is cheap, it is economically advantageous. However, in the case of the jelly-roll type electrode assembly, when the lithium iron phosphate is applied to a current collector and rolled and to coat over the current collector and to be wound, as described above, a crack may occur at the curved portion of the electrode assembly. Accordingly, the structure of the electrode assembly to prevent the crack at the curved portion of the electrode assembly may be particularly proper when the cathode active material is the lithium iron phosphate.

Also, the present invention provides a secondary battery including the jelly-roll type electrode assembly.

The jelly-roll type electrode assembly may be used for all cylindrical secondary batteries, square-shaped secondary batteries, and pouch-shaped secondary batteries. In the present embodiment, since being manufactured through winding and compressing processes, the jelly-roll type electrode assembly may be particularly used for square-shaped secondary batteries.

In detail, a square-shaped secondary battery including the jelly-roll type electrode assembly has a structure in which the jelly-roll type electrode assembly is built in a square-shaped metallic case and a top cap having a protruded electrode terminal is coupled with an open top end of the case. An anode of the jelly-roll type electrode assembly is electrically connected to a bottom end of an anode terminal on the top cap via an anode tab, and the anode terminal is insulated from the top cap by an insulating element. On the contrary, in the case of a cathode of the jelly-roll type electrode assembly, a cathode tab thereof is electrically connected to the top cap formed of a conductive material such as aluminum and stainless steel, which forms a cathode terminal. Also, excluding electrode tabs, to provide an electrical insulating state between the jelly-roll type electrode assembly and the top cap, a sheet type insulating element is inserted into a space between the case ad the jelly-roll type electrode assembly, the top cap is mounted thereon, and then top cap and the case are coupled with each other by welding along a contact surface between the top cap and the case. After that, an electrolyte is injected into an inlet for the electrolyte and is sealed by welding using a metallic ball and epoxy is applied to a welding portion, thereby manufacturing the square-shaped secondary battery including the jelly-roll type electrode assembly.

Also, the present invention provides a medium-large sized battery module or battery pack, including a plurality of electrically connected secondary batteries. The medium-large sized battery module or battery pack may be used as a medium-large sized device power source of one or more of power tools, electric vehicles including electric vehicles (EVs), hybrid electric vehicles (HEVs) and plug-in hybrid electric vehicles (PHEVs), electric trucks, electric commercial vehicles, and power storage systems.

Figure 2:
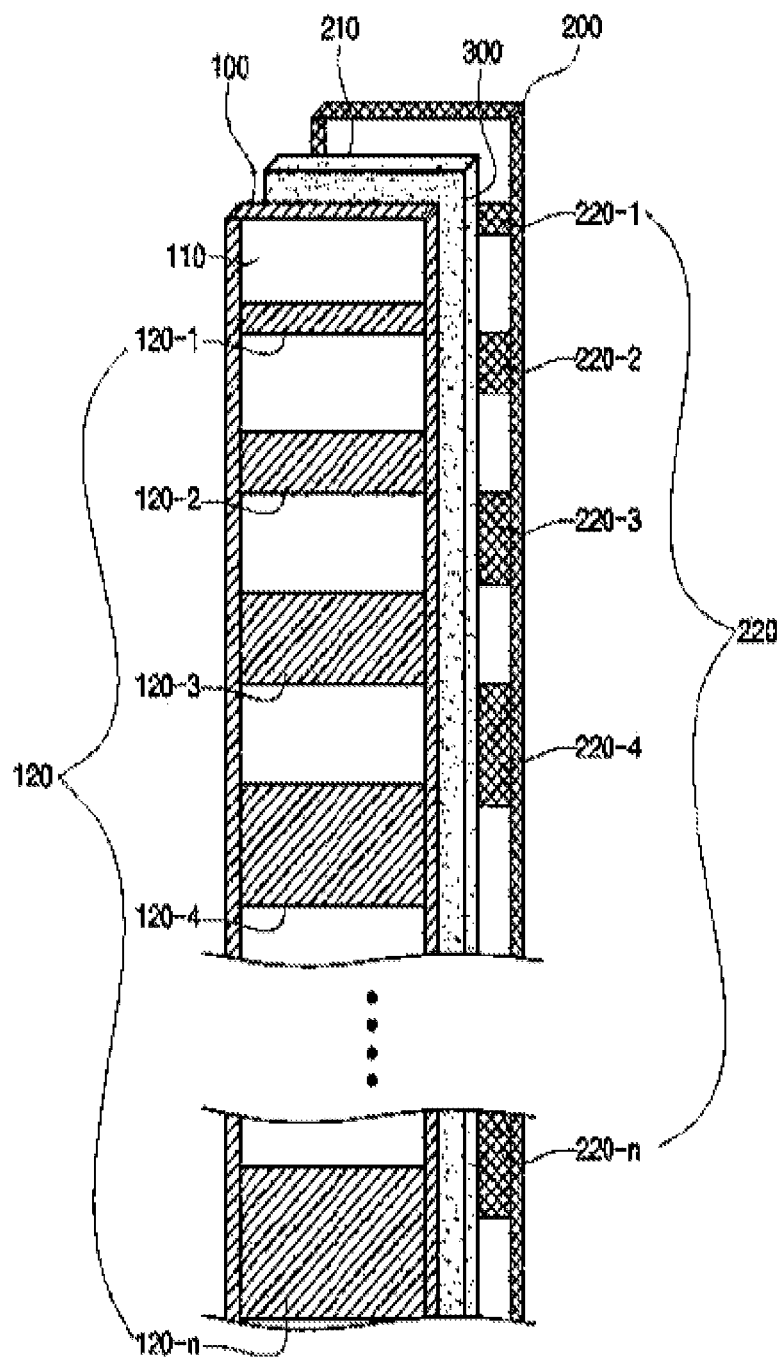
FIG. 2 is a perspective view illustrating a state of a jelly-roll type electrode assembly pattern-coated with active materials before being wound and compressed according to an embodiment of the present invention.

On the other hand, FIG. 2 is a perspective view illustrating a state of a jelly-roll type electrode assembly pattern-coated with active materials before being wound and compressed according to an embodiment of the present invention.

As shown in FIG. 2, before winding and compressing the jelly-roll type electrode assembly pattern-coated with the active materials, the separator 300 is arranged and the anode 100 and the cathode 200 are arranged on both sides of the separator 300. In this case, the anode includes an anode flat coated portion 110 coated with an anode active material and an anode curved uncoated portion 120 not coated with the anode active material, which are alternately formed. A width of the anode flat coated portion 110 are uniform, but a width of the anode curved uncoated portion 120 becomes wider progressively from a first end to a last end of the anode in contact with a core for winding the electrode assembly. Also, the cathode 200 includes a cathode flat coated portion 210 coated with a cathode active material and a cathode curved uncoated portion 220 not coated with the cathode active material, which are alternately formed. A width of the cathode flat coated portion 210 is uniform, but a width of the cathode curved uncoated portion 220 becomes wider progressively from a first end to a last end of the cathode in contact with the core for winding the electrode assembly.

Figure 3:
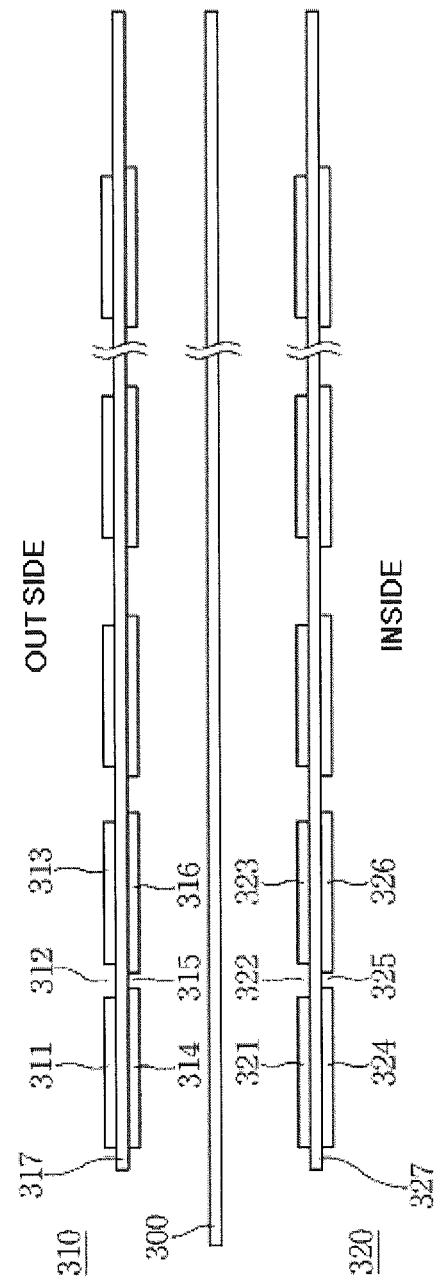
FIG. 3 is a cross-sectional view illustrating the state of the jelly-roll type electrode assembly pattern-coated with active materials before being wound and compressed according to an embodiment of the present invention.

On the other hand, FIG. 3 is a cross-sectional view illustrating cross-sections of a cathode 310, the separator 300, and an anode 320 before winding and compressing the jelly-roll type electrode assembly pattern-coated with the active materials.

Referring to FIG. 3, the cathode 310 may include a cathode current collector 317 and cathode flat coated portions 311, 313, 314, and 316 coated with a cathode active material on the cathode current collector 317. The cathode flat coated portions 311 and 313 toward the outside may have widths smaller than those of the cathode flat coated portions 314 and 316 toward the inside. However, in the case of the jelly-roll type electrode assembly after being wound, the cathode flat coated portions may have the same width. Similarly, the anode may include anode flat coated portions 321, 323, 324, and 326 coated with an anode active material on an anode current collector 327 and widths of the anode flat coated portions of the jelly-roll type electrode assembly after being wound may be the same as one another.

On the other hand, cathode curved uncoated portions 312 and 315 not coated with the cathode active material may be formed between the respective cathode flat coated portions. The cathode curved uncoated portions may have widths increasing progressively from a first end to a last end of the cathode 310. In addition, considering the operation of winding the electrode assembly, as described above, the cathode curved uncoated portion 315 formed inside may have a width wider than that of the cathode curved uncoated portion 312 formed outside in a location corresponding thereto.

Similarly, anode curved uncoated portions 322 and 325 not coated with an anode active material may be formed between the respective anode flat coated portions. The anode curved uncoated portions may have widths increasing progressively from a first end to a last end of the anode 320. Additionally, considering the operation of winding the electrode assembly, as described above, the anode curved uncoated portion 325 formed inside may have a width wider than that of the anode curved uncoated portion 322 formed outside in a location corresponding thereto.

While the present invention has been shown and described in connection with the exemplary embodiments, it will be apparent to those skilled in the art that modifications and variations can be made without departing from the spirit and scope of the invention as defined by the appended claims.

The invention claimed is:

1. A jelly-roll electrode assembly pattern-coated with active materials, manufactured by winding and compressing a separator and an anode and a cathode arranged on both sides of the separator,
    wherein the anode comprises an anode flat coated portion coated with an anode active material and an anode curved uncoated portion not coated with the anode active material, which are alternately formed,
    wherein the cathode comprises a cathode flat coated portion coated with a cathode active material and a cathode curved uncoated portion not coated with the cathode active material, which are alternately formed,
    wherein the anode flat coated portion is coated with the anode active material on both sides of the anode, which are outside and inside of the anode,
    wherein the cathode flat coated portion is coated with the cathode active material on both sides of the cathode, which are outside and inside of the cathode,
    wherein the anode flat coated portion formed outside of the anode has a width smaller than that of the anode flat coated portion formed inside of the anode in a location corresponding thereto, and
    wherein the cathode flat coated portion formed outside of the cathode has a width smaller than that of the cathode flat coated portion formed inside of the cathode in a location corresponding thereto.

2. The jelly-roll electrode assembly of claim 1, wherein the anode curved uncoated portion has widths increasing progressively from a first end to a last end of the anode in contact with a core for winding the electrode assembly.

3. The jelly-roll electrode assembly of claim 1, wherein a first radius curvature of the anode curved uncoated portion is smaller than a first radius curvature of the cathode curved uncoated portion.

4. The jelly-roll electrode assembly of claim 3, wherein a width of an inner side of the anode curved uncoated portion satisfies a following equation, $$W(I)n_{anode} \leq \pi\{(Ts/2)+(n-1)(Ts+Ta/2+Tc/2)\} \quad \text{[Equation (1)]}$$

wherein $W(I)n_{anode}$ designates a width of an inner side of an nth anode curved uncoated portion, Ts designates a thickness of the separator, Ta designates a thickness of the anode, Tc designates a thickness of the cathode, and n is an integer.

5. The jelly-roll electrode assembly of claim 3, wherein a width of an outer side of the anode curved uncoated portion satisfies a following equation, $$W(II)n_{anode} \leq \pi\{(Ts/2+Ta)+(n-1)(Ts+Ta/2+Tc/2)\} \quad \text{[Equation (2)]}$$

wherein $W(II)n_{anode}$ designates a width of an outer side of an nth anode curved uncoated portion, Ts designates a thickness of the separator, Ta designates a thickness of the anode, Tc designates a thickness of the cathode, and n is an integer.

6. The jelly-roll electrode assembly of claim 3, wherein the cathode curved uncoated portion has widths increasing progressively from a first end to a last end of the cathode in contact with a core for winding the electrode assembly.

7. The jelly-roll electrode assembly of claim 3, wherein a width of an inner side of the cathode curved uncoated portion satisfies a following equation, $$W(III)n_{cathode} \leq \pi\{(3Ts/2+Ta)+(n-1)(Ts+Ta/2+Tc/2)\} \quad \text{[Equation (3)]}$$

wherein $W(III)n_{cathode}$ designates a width of an inner side of an nth cathode curved uncoated portion, Ts designates a thickness of the separator, Ta designates a thickness of the anode, Tc designates a thickness of the cathode, and n is an integer.

8. The jelly-roll electrode assembly of claim 3, wherein a width of an outer side of the cathode curved uncoated portion satisfies a following equation, $$W(IV)n_{cathode} \leq \pi\{(3Ts/2+Ta+Tc)+(n-1)(Ts+Ta/2+Tc/2)\} \quad \text{[Equation (4)]}$$

wherein $W(IV)n_{cathode}$ designates a width of an outer side of the nth cathode curved uncoated portion, Ts designates the thickness of the separator, Ta designates a thickness of the anode, Tc designates a thickness of the cathode, and n is an integer.

9. The jelly-roll electrode assembly of claim 1, wherein a first radius curvature of the cathode curved uncoated portion is smaller than a first radius curvature of the anode curved uncoated portion.

10. The jelly-roll electrode assembly of claim 9, wherein a width of an inner side of the cathode curved uncoated portion satisfies a following equation $$W(I)n_{cathode} \leq \pi\{(Ts/2)+(n-1)(Ts+Ta/2+Tc/2)\} \quad \text{[Equation (5)]}$$

wherein $W(I)n_{cathode}$ designates a width of an inner side of an nth cathode curved uncoated portion, Ts designates a thickness of the separator, Ta designates a thickness of the cathode, Tc designates a thickness of the anode, and n is an integer.

11. The jelly-roll electrode assembly of claim 9, wherein a width of an outer side of the cathode curved uncoated portion satisfies a following equation, $$W(II)n_{cathode} \leq \pi\{(Ts/2+Ta)+(n-1)(Ts+Ta/2+Tc/2)\} \quad \text{[Equation (6)]}$$

wherein $W(II)n_{cathode}$ designates a width of an outer side of the nth cathode curved uncoated portion, Ts designates the thickness of the separator, Ta designates a thickness of the cathode, Tc designates a thickness of the anode, and n is an integer.

12. The jelly-roll electrode assembly of claim 9, wherein a width of an inner side of the anode curved uncoated portion satisfies a following equation, $$W(III)n_{anode} \leq \pi\{(3Ts/2+Ta)+(n-1)(Ts+Ta/2+Tc/2)\} \quad \text{[Equation (7)]}$$

wherein $W(III)n_{anode}$ designates a width of an inner side of an nth anode curved uncoated portion, Ts designates a thickness of the separator, Ta designates a thickness of the cathode, Tc designates a thickness of the anode, and n is an integer.

13. The jelly-roll electrode assembly of claim 9, wherein a width of an outer side of the anode curved uncoated portion satisfies a following equation, $$W(IV)n_{anode} \leq \pi\{(3Ts/2+Ta+Tc)+(n-1)(Ts+Ta/2+Tc/2)\} \quad \text{[Equation (8)]}$$

wherein $W(IV)n_{anode}$ designates a width of an outer side of the nth anode curved uncoated portion, Ts designates the thickness of the separator, Ta designates a thickness of the cathode, Tc designates a thickness of the anode, and n is an integer.

14. The jelly-roll electrode assembly of claim 1, wherein the cathode active material is lithium iron phosphate having an olivine crystal structure having a composition satisfying a following formula, $$Li_{1+a}Fe_{1-x}M_x(PO_{4-b})X_b \quad \text{Formula (1)}$$

wherein M is at least one selected from the group consisting Al, Mg, Ni, Co, Mn, Ti, Ga, Cu, V, Nb, Zr, Ce, In, Zn, and Y, X is at least one selected from the group consisting of F, S, and N, and $-0.5 \leq a \leq +0.5$, $0 \leq x \leq 0.5$, $0 \leq b \leq 0.1$.

15. The jelly-roll electrode assembly of claim 14, wherein lithium iron phosphate is $LiFePO_4$.

16. A secondary battery comprising the jelly-roll electrode assembly of claim 1.

17. A medium-large sized battery module comprising a plurality of secondary batteries of claim 16, which are electrically connected to one another.

18. The medium-large sized battery module of claim 17, being used as a medium-large sized device power source of one or more of power tools, electric vehicles comprising electric vehicles (EVs), hybrid electric vehicles (HEVs) and plug-in hybrid electric vehicles (PHEVs), electric trucks, electric commercial vehicles, and power storage systems.

19. A medium-large sized battery pack comprising a plurality of secondary batteries of claim 16, which are electrically connected to one another.

20. The medium-large sized battery pack of claim 19, being used as a medium-large sized device power source of one or more of power tools, electric vehicles comprising electric vehicles (EVs), hybrid electric vehicles (HEVs) and plug-in hybrid electric vehicles (PHEVs), electric trucks, electric commercial vehicles, and power storage systems.

* * * * *